April 12, 1938.   S. R. RAMSAY   2,114,009
LIQUOR AGING MEANS
Original Filed Jan. 25, 1935

INVENTOR:
SAMUEL R. RAMSAY
BY Adelbert Snapp
ATTORNEY

Patented Apr. 12, 1938

2,114,009

UNITED STATES PATENT OFFICE 2,114,009

LIQUOR AGING MEANS

Samuel R. Ramsay, Santa Cruz, Calif.

Application January 25, 1935, Serial No. 3,437
Renewed March 14, 1938

7 Claims. (Cl. 99—277.1)

The present invention relates to improvements in aging means for liquor and similar beverages, which after manufacture have to go through an extended period of ripening or aging for the removal of harmful component parts of the original product of manufacture. This aging process is carried on, at the present time, in wooden barrels, there being a certain interaction between the wood and the liquor which tends to eliminate the harmful gases. But, as conducted at the present time, the chemical process of aging is very slow and usually extends over a period of years.

It is also well known that when the liquor is placed in a container of different material, such as a glass bottle or tin can, the aging process is arrested, the presence of the right kind of wood and the aeration offered by a wooden barrel, however slight, being necessary requisites for proper aging.

It is the principal object of the present invention to provide an aging means for liquor that may be used in connection with a glass bottle, tin can or any other kind of container made of impervious material and that will tend to speed up the aging process in view of the fact that the aging means is in more intimate contact with the body of the liquor and is constructed in such a manner that much more surface is available for a certain quantity of liquor.

It is further proposed in this invention to provide the aging means in such a manner that a certain amount of circulation sets in immediately, whereby the liquor is made to pass the aging means continually and whereby new amounts of liquor are brought into contact with the aging means in a continuous process.

It is further proposed to provide a certain amount of aeration for the otherwise impervious container whereby harmful gases liberated as a result of the aging process may be discharged from the container, without allowing any of the liquor itself to escape.

It is further proposed to provide the aging means as a part of the closure for the container whereby the manipulation of the aging means is much facilitated.

It is further proposed to provide an aging means that while it speeds up the aging, still follows the natural process which seems to be the only one in which liquor ages properly.

Further and other objects of the invention will appear as the specification proceeds.

The preferred form of the invention is illustrated in the accompanying drawing in which—

Figure 1:
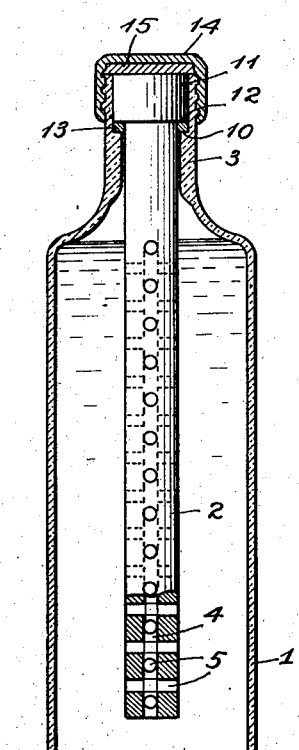
Figure 3:
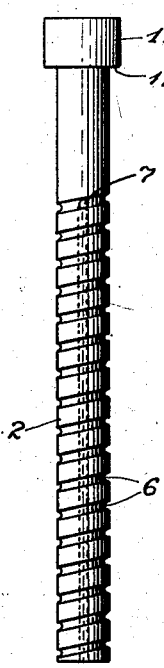
Figure 2:
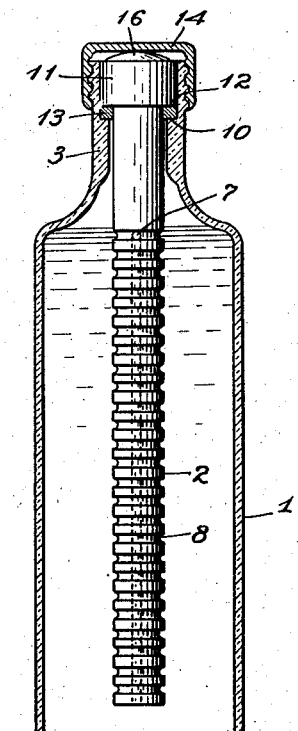
Figure 4:
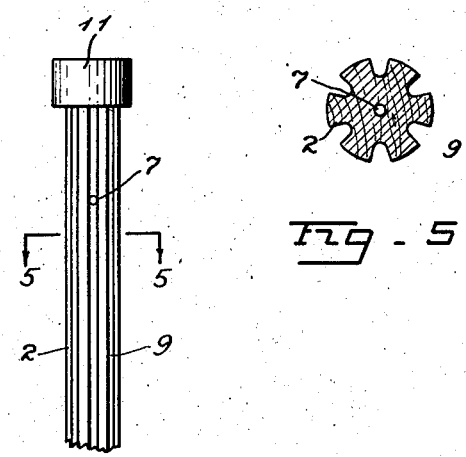

Figure 1 shows a vertical central section through a glass bottle having my aging means combined therewith, Figure 2 a vertical central section through a glass bottle having a modified aging stick and a modified attaching means for the same Figure 3 a side elevation of an aging stick detached from the bottle, the aging stick being slightly modified;

Figure 4 a side elevation of a still further modified form of aging stick, and

Figure 5:
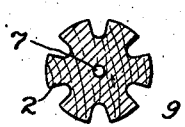

Figure 5 a horizontal section through the aging stick of Figure 4 as seen from line 5—5.

While I have shown only the preferred forms of my invention I wish to have it understood that various changes or modifications may be made within the scope of the claims hereto attached without departing from the spirit of the invention.

Referring to the drawing in detail, the bottle 1 shown in Figure 1 may be of any suitable form. It is shown in the drawing as square in cross-section but any other suitable form might be substituted, a flat form being less desirable than a square or round form. It is shown as made of glass but a metal container may be substituted without interfering with the idea of the invention.

The aging means comprises an aging stick 2, made of white oak and charred, which extends centrally into the bottle from the neck 3 thereof. The stick is preferably grooved or perforated to increase the surface thereof and this may be accomplished in many different ways without departing from the spirit of the invention. In the form shown in Figure 1 a central bore 4 extends from the bottom to within close proximity of the top of the bottle. A series of transverse ports 5 extend through the stick, the ports preferably alternating so that each is disposed at right angles to its neighboring ports.

In the form shown in Figure 3 a spiral groove 6 is cut into the outside of the stick while the central bore may connect with the outside through one or more ports 7 near the upper end of the stick. The stick shown in Figure 2 is similarly constructed except that annular parallel grooves 8 are provided instead of the spiral groove 6. And finally in the form shown in Figures 4 and 5, longitudinal grooves 9 are provided to increase the surface area.

The sticks are secured in the bottles in such a manner that while making a liquid tight container provision is made for a slight amount of aeration allowing gases liberated by the aging process to escape. In the form shown in Figure 1 the neck 3 of the bottle is provided with an internal shoulder 10 and the aging stick is provided with an enlarged head 11 forming a shoulder 12 made for coaction with the shoulder 10 in compressing a sealing medium such as the cork ring 13 therebetween. This cork ring may also allow of slight expansion of the head of the aging stick due to absorption of moisture. The top of the head of the aging stick is covered by the threaded cap 14, a washer 15 of slightly porous material, such as fiber, being interposed. It will then be seen that the washer 10 coacts with the aging stick in forming a liquid tight seal for the bottle, while at the same time gases liberated by the aging process may rise through the porous aging stick to the cap and may escape through the porous washer 15 and between the threads of the cap and the bottle.

In the form shown in Figure 2 a slightly modified form is used, serving the same purpose. In this form the shoulders 10 and 12 are provided in the same manner and bear on the sealing ring 13, while the top of the aging stick is rounded, as shown at 16 and thus spaces the cap 14 from the top edge of the bottle sufficiently to allow gases to escape.

The manner in which my invention operates will be readily understood from the foregoing description. The aging stick itself with its shaped surface offers a large area for reaction with the liquor in aging the latter. At the same time a certain amount of circulation is set up, the liquor rising through capillary attraction in the central bore and discharging through the lateral ports in a continuous slow process whereby new liquor comes in contact with the aging stick continually and whereby the aging process is speeded up.

While the seal at the shoulders prevents any splashing out of the liquid, the aging stick itself, which is porous allows gases to escape through the top and the cap does not hermetically seal the bottle.

The saving that may be effected by the use of my aging means is apparent. The handling of liquor in barrels is expensive and takes up much space at the place of manufacture. Where my aging means is used the liquor may be filled into the bottle or can immediately, the bottles may be dated and packed in cases and distributed throughout the country to be stored in warehouses. The dating of the bottles gives the advantage of advising the consumer how long the liquor has been aged and once the proper aging period has been established the user can be sure that the liquor is properly aged.

My aging means may be used for any kind of liquor, whiskey, brandy, fortified wines, gin, etc. For gin the wood should be charred all the way through so that the white color of the gin may not be changed.

I claim:

1. In combination, a container for liquor and the like having a neck and a shoulder in the neck, a stick of aging wood projecting into the container and having a head with a shoulder adapted for coaction with the first shoulder in closing the container and means bearing on top of the stick for urging the shoulders together.

2. In combination, a container for liquor and the like having a neck and a shoulder in the neck, a stick of aging wood projecting into the container and having a head with a shoulder adapted for coaction with the first shoulder in closing the container and means bearing on the top of the stick for urging the shoulders together, the latter means including a cap forming a second closure for the container and arranged to allow of leakage of gases passing through the stick.

3. An aging member for liquor or the like comprising an elongated stick entirely of aging wood having a longitudinal bore extending from one end thereof to a point spaced from the other end and having transverse ports leading from the bore to the outside of the stick.

4. An aging member for liquor or the like comprising an elongated stick entirely of aging wood having a longitudinal bore extending from one end thereof to a point spaced from the other end, and having transverse ports leading from the bore to the outside of the stick, and having grooves cut into the outer surface thereof.

5. In combination, a container for liquor or the like having a closure and a shoulder below the closure, an aging stick projecting into the container and having a shoulder for coaction with the container shoulder and a washer interposed between the two shoulders for preventing the escape of the liquor, the closure being made to bear on the stick for urging its shoulder upon the washer.

6. In combination, a container for liquor or the like having a closure and a shoulder below the closure, an aging stick projecting into the container and having a shoulder for coaction with the container shoulder, and a washer interposed between the two shoulders for preventing the escape of the liquor, the closure being made to bear on the stick for urging its shoulder upon the washer, there being sufficient clearance between the container and the closure to allow gases rising through the stick to escape.

7. In combination, a container for liquor and the like having a neck and a shoulder in the neck, a stick of aging wood having a head fitting in the neck with a shoulder adapted to rest on the former shoulder, a washer interposed between the shoulders, a cap for the container arranged to bear on the head of the aging stick for urging the head upon the shoulder in the neck, the stick projecting into the liquor and having a longitudinal bore extending from its free end to a point spaced from the head and having transverse passages extending from the bore to the outside of the stick whereby the liquor is made to circulate through the stick and gases are allowed to escape through the head of the stick, the cap being secured to the container neck with sufficient clearance to allow the gases to escape therebetween.

SAMUEL R. RAMSAY.